(12) United States Patent
Chen et al.

(10) Patent No.: US 8,447,126 B2
(45) Date of Patent: May 21, 2013

(54) IMAGE PROCESSING METHOD AND RELATED APPARATUS

(75) Inventors: Chung-Yi Chen, Nantou County (TW); Chia-Hao Chung, Taoyuan County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 958 days.

(21) Appl. No.: 12/509,495

(22) Filed: Jul. 27, 2009

(65) Prior Publication Data
US 2010/0177974 A1 Jul. 15, 2010

(30) Foreign Application Priority Data
Jan. 9, 2009 (TW) .............................. 98100776 A

(51) Int. Cl.
*G06K 9/36* (2006.01)
*G06K 9/00* (2006.01)
*H04N 11/02* (2006.01)
*G06T 7/20* (2006.01)
*H04N 7/50* (2006.01)

(52) U.S. Cl.
CPC .. *G06T 7/20* (2013.01); *H04N 7/50* (2013.01); *G06T 7/2013* (2013.01); *G06T 7/2033* (2013.01)
USPC ........... 382/236; 382/103; 382/107; 382/197; 375/240.13; 375/240.15; 375/240.16; 348/402.1

(58) Field of Classification Search
USPC ............. 382/236, 103, 107, 197; 375/240.13, 375/240.15, 240.16; 348/402.1
See application file for complete search history.

(56) References Cited

U.S. PATENT DOCUMENTS

| 6,008,865 | A | * | 12/1999 | Fogel | 348/700 |
|---|---|---|---|---|---|
| 7,519,230 | B2 | * | 4/2009 | Wittebrood et al. | 382/236 |
| 7,612,909 | B2 | * | 11/2009 | Kondo et al. | 358/1.9 |
| 2004/0252764 | A1 | * | 12/2004 | Hur et al. | 375/240.16 |
| 2005/0271144 | A1 | * | 12/2005 | Yoshiwara | 375/240.16 |
| 2006/0017843 | A1 | * | 1/2006 | Shi et al. | 348/441 |
| 2007/0002058 | A1 | * | 1/2007 | Wittebrood | 345/475 |
| 2007/0140346 | A1 | * | 6/2007 | Chen et al. | 375/240.16 |
| 2009/0251612 | A1 | * | 10/2009 | Van Gurp | 348/614 |

FOREIGN PATENT DOCUMENTS

GB 2279531 A * 1/1995

OTHER PUBLICATIONS

Thoma, et al. "Motion Compensating Interpolation Considering Covered and Uncovered Background." Signal Processing: Image Communication. 1. (1989): 191-212. Print.*

* cited by examiner

*Primary Examiner* — Michael A Newman
(74) *Attorney, Agent, or Firm* — Winston Hsu; Scott Margo

(57) ABSTRACT

An image processing method is used for determining a motion vector of a covered/uncovered area within an interpolated picture when picture interpolation is performed. The interpolated picture includes a plurality of blocks, and the image processing method includes: generating a first motion vector and a second motion vector of a block within the interpolated picture; determining which one of the covered and uncovered areas the block is located in, and calculating a reference vector according to the first and second motion vectors; and determining a motion vector of the block according to the reference vector, wherein the reference vector is obtained from vector calculation of the first and second motion vectors using the principle of similar triangles.

2 Claims, 12 Drawing Sheets

| $MV_{-22}$ | $MV_{-12}$ | $MV_{-02}$ | $MV_{12}$ | $MV_{22}$ |
| --- | --- | --- | --- | --- |
| $MV_{-21}$ | $MV_{-11}$ | $MV_{01}$ | $MV_{11}$ | $MV_{21}$ |
| $MV_{-20}$ | $MV_{-10}$ | $MV_{00}$ | $MV_{10}$ | $MV_{20}$ |
| $MV_{-2-1}$ | $MV_{-1-1}$ | $MV_{0-1}$ | $MV_{1-1}$ | $MV_{2-1}$ |
| $MV_{-2-2}$ | $MV_{-1-2}$ | $MV_{0-2}$ | $MV_{1-2}$ | $MV_{2-2}$ |

FIG. 5A

IMAGE PROCESSING METHOD AND RELATED APPARATUS

BACKGROUND OF THE INVENTION

1. Field of the Invention

The present invention relates to an image processing mechanism, and more particularly, to an image processing method and related apparatus for determining an image of a covered/uncovered area of an interpolated picture.

2. Description of the Prior Art

In a conventional picture interpolation mechanism, a motion vector of an interpolated block in an interpolated picture is directly determined according to a calculated result of a block matching algorithm and an image of the interpolated block is thereby generated according to the motion vector. Please refer to FIG. 1. FIG. 1 is a diagram illustrating an operation of the conventional block matching algorithm. As shown in FIG. 1, image pictures $F_2$, $F_3$ are sequential pictures of input images, an image picture $F_{inter}$ is an interpolated picture generated from the conventional picture interpolation mechanism and A'~L' are background images of image pictures $F_2$, $F_3$, where each dotted-line arrow indicates a moving direction of a background image and each solid-line arrow indicates a moving direction of a foreground object. Background images F'~I' of the image picture $F_2$ are covered by the foreground object whereas in the next image picture $F_3$, background images C'~F' are covered by the foreground object. Since the block matching algorithm is capable of finding background images A', B', J', K', L' within sequential image pictures F2, F3, a target motion vector of a corresponding block can be determined correctly and background images A' B', J', K', L' can be displayed in the image picture $F_{inter}$ (as illustrated in FIG. 1). In addition, the block matching algorithm is also capable of finding an image of the foreground object within sequential image pictures F2, F3; therefore a target motion vector of a corresponding block can be determined correctly and an image of the foreground object can be displayed in image picture $F_{inter}$.

When determining target motion vectors of interpolated blocks within regions $R_{inter}$ and $R_{inter}'$, background images within regions $R_{inter}$ and $R_{inter}'$, should, ideally, be able to be displayed since the target motion vectors of regions $R_{inter}$ and $R_{inter}'$ are background motion vectors. For example, background images C' and D' ideally should be displayed in region $R_{inter}$ while background images H' and I' should be displayed in region $R_{inter}'$. In fact, since the block matching algorithm cannot find background images C', D' (covered by a foreground object) in image picture $F_3$ and, likewise, cannot find images H', I' (covered by a foreground object) in image picture $F_2$, the block matching algorithm fails to determine the correct motion vectors, leading to an image distortion in the interpolated regions $R_{inter}$ and $R_{inter}'$. When applied to a frame rate conversion, the conventional picture interpolation mechanism significantly degrades the quality of output images.

SUMMARY OF THE INVENTION

One objective of the present invention is therefore to provide an image processing method and related apparatus capable of determining motion vectors of interpolated blocks correctly, to solve the aforementioned problems.

According to an embodiment of the present invention, an image processing method is disclosed. The image processing method determines a motion vector of a covered/uncovered area of an interpolated picture when a picture interpolation is performed, where the interpolated picture includes a plurality of blocks. The image processing method includes: generating a first motion vector and a second motion vector of a block within the interpolated picture; referring to the first and second motion vectors for determining which one of the covered and uncovered areas the block is located in and calculating a reference vector; and determining a motion vector of the block according to the reference vector; wherein the reference vector is obtained from a vector calculation of the first and second motion vectors using a principle of similar triangles.

In addition, according to another embodiment of the present invention, an image processing method is disclosed. The image processing method determines a motion vector of a covered/uncovered area of an interpolated picture when a picture interpolation is performed, where the interpolated picture includes a plurality of blocks. The image processing method includes: utilizing a block matching algorithm to calculate motion vectors of a plurality of blocks within the interpolated picture, a previous interpolated picture and a next interpolated picture; generating a first motion vector and a second motion vector of a block within the interpolated picture according to a motion vector of the block within the interpolated picture and motion vectors of a plurality of neighboring blocks, wherein the motion vector of the block is a first candidate vector; calculating a reference vector of the block according to the first motion vector and the second motion vector; utilizing the reference vector with the block within the interpolated picture as a starting position to therefore point at a matching block within the previous interpolated picture or within the next interpolated picture, and setting a motion vector of the matching block within the previous interpolated picture or within the next interpolated picture as a second candidate vector; and performing a picture interpolation of the block according to the first and the second candidate vectors.

According to another embodiment of the present invention, an image processing apparatus is disclosed. The image processing apparatus determines a motion vector of a covered/uncovered area within an interpolated picture, where the interpolated picture includes a plurality of blocks. The image processing apparatus includes a storage unit and a calculating unit. The storage unit is for storing at least image data of the interpolated picture, a previous interpolated picture and a next interpolated picture, and original motion vectors of blocks. The calculating unit is coupled to the storage unit, and includes a vector generating module and a vector determining module. The vector generating module is for determining a first motion vector and a second motion vector. The vector determining module is for referring to the first motion vector and the second motion vector for determining whether the block is located in either the covered area or the uncovered area and calculating a reference vector, and for determining a motion vector of the block according to the reference vector; wherein the reference vector is derived from a vector calculation of the first and the second motion vectors according to a principle of similar triangles.

According to yet another embodiment of the present invention, an image processing apparatus is disclosed. The image processing apparatus determines a motion vector of a covered/uncovered area within an interpolated picture, where the interpolated picture includes a plurality of blocks. The image processing apparatus includes a storage unit and a calculating unit. The storage unit is for storing at least image data of the interpolated picture, a previous interpolated picture and a next interpolated picture, and original motion vectors of blocks. The calculating unit is coupled to the storage unit, and includes a first candidate vector generating module, a second candidate vector generating module, and a picture interpolation module. The first candidate vector generating module is for determining a first motion vector and a second motion vector of a block within the interpolated picture according to a motion vector of the block within the interpolated picture and motion vectors of a plurality of neighboring blocks, wherein the motion vector of the block is a first candidate vector. The second candidate vector generating module is for calculating a reference vector of the block according to the first motion vector and the second motion vector, utilizing the reference vector with the block within the interpolated picture as a starting position to therefore point at a matching block within the previous interpolated picture or within the next interpolated picture, and setting a motion vector of the matching block within the previous interpolated picture or within the next interpolated picture as a second candidate vector. The picture interpolation module is for performing a picture interpolation of the block according to the first and the second candidate vectors.

The advantage of the present invention is that, if a block is actually located within a covered area or uncovered area, the aforementioned method and apparatus are capable of generating an image correctly by referring to the second candidate vector which corresponds to a background motion vector, and therefore a better image quality can be acquired; if a block is not located within a covered area or uncovered area, the aforementioned method and apparatus are capable of generating an image correctly by referring to the first candidate vector which is a motion vector derived from a calculation applied to the block using block matching algorithm, and therefore the image quality is not affected.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A is an exemplary diagram illustrating a plurality of values calculated by the calculating unit shown in FIG. 2 to represent a variation extent of motion vectors.

DETAILED DESCRIPTION

Figure 1:
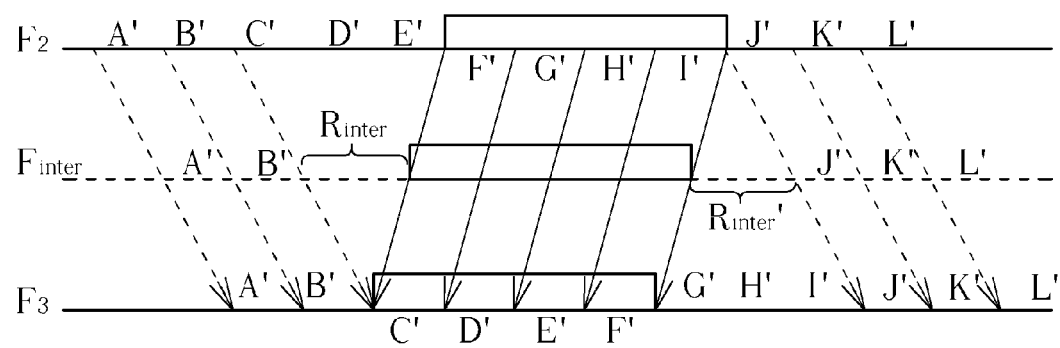
FIG. 1 is a diagram illustrating operation of a conventional block matching algorithm.

For ease of reading, the following describes those background image areas which are unblocked by a foreground object in a previous picture but blocked by a foreground object in a next picture as covered areas, whereas those background image areas which are blocked by a foreground object in a previous picture but unblocked by a foreground object in a next picture as uncovered areas; for example, the background image areas C', D', E' shown in FIG. 1 are covered areas while the background image areas G', H', I' are uncovered areas. It should be noted that the definitions described above are only for ease of explanation, and are not meant to limit the scope of the present invention.

Figure 2:
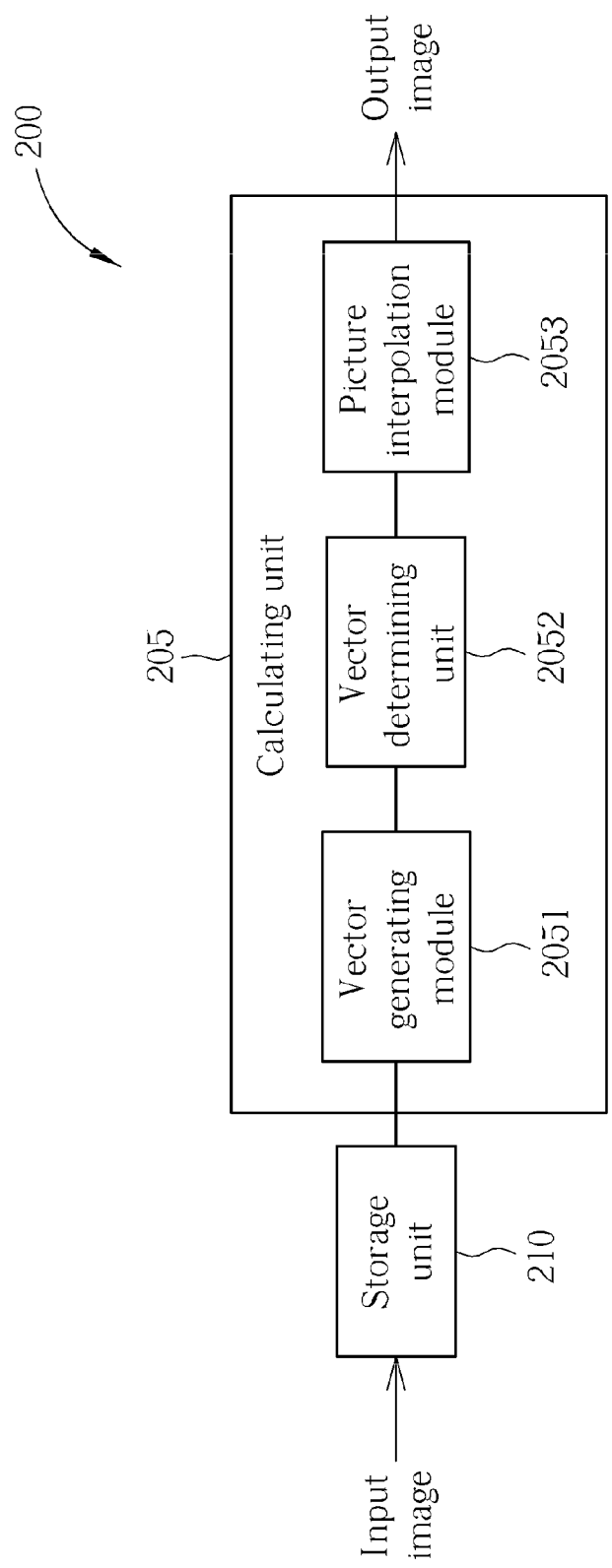
FIG. 2 is a block diagram of a first embodiment of an image processing apparatus according to the present invention.
Figure 3:
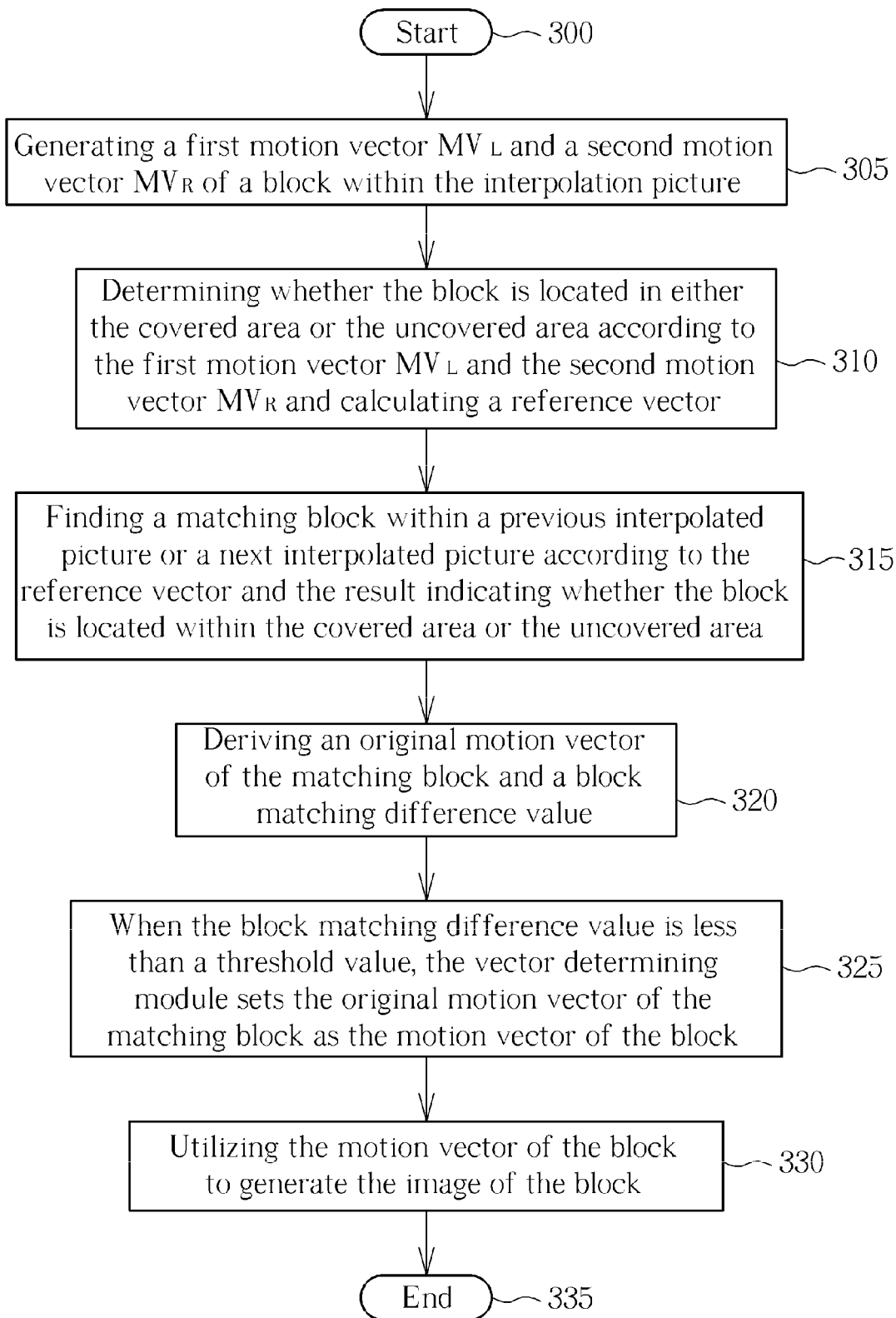
FIG. 3 is a flowchart of the operation of the image processing apparatus shown in FIG. 2.

Please refer to FIG. 2 and FIG. 3. FIG. 2 illustrates an image processing apparatus 200 according to a first embodiment of the present invention, and FIG. 3 illustrates a flowchart of operation of the image processing apparatus 200 shown in FIG. 2. For ease of explanation, the following describes the operation of the image processing apparatus 200 in FIG. 2 along with steps shown in FIG. 3. It should be noted that the steps are not required to be executed in the exact order shown in FIG. 3 if the same result can be substantially attained. Additionally, all the steps in FIG. 3 are not required to be executed continuously, i.e., other steps can be inserted in between the steps in FIG. 3. The image processing apparatus 200 is for determining a motion vector of a covered/uncovered area within an interpolated picture which is composed of a plurality of blocks. As shown in FIG. 2, the image processing unit 200 includes a calculating unit 205 and a storage unit 210. The storage unit 210 is for storing at least image data of the interpolated picture, a previous interpolated picture and a next interpolated picture, and original motion vectors of blocks. The calculating unit 205 is coupled to the storage unit 210 and includes a vector generating module 2051, a vector determining module 2052 and a picture interpolation module 2053, wherein the vector generating module 2051 is for determining/generating a first motion vector $MV_L$ and a second motion vector $MV_R$ of a block within the interpolation picture (i.e., the first interpolation picture) in step 305. In a practical implementation of the embodiment, the vector generating module 2051 generates two corresponding motion vectors $MC_L$, $MV_R$ for every block within the interpolation picture, where each block comprises, for example, a pixel range of 8×8. However, this is not supposed to be a limitation to the present invention, and other modifications of the exemplary pixel range still fall within the scope of the present invention. In addition, regarding the block, the vector determining module 2052 determines whether the block is located in either the covered area or the uncovered area according to the first motion vector $MV_L$ and the second motion vector $MV_R$, calculates a reference vector (step 310), and stores the reference vector into the storage unit 210, wherein the reference vector is derived from a vector calculation of the first motion vector $MV_L$ and the second motion vector $MV_R$ according to the principle of similar triangles. In a practical implementation, the vector determining module 2052 utilizes a vector result derived from the first motion vector $MV_L$ minus the second motion vector $MV_R$ to determine that the block is located in either the covered area or the uncovered area.

Then, the vector determining module 2052 will find a matching block within a previous interpolated picture or a next interpolated picture according to the reference vector and the result indicating whether the block is located within the covered area or the uncovered area (step 315), and derive an original motion vector of the matching block and a block matching difference value (step 320); when the block matching difference value is less than a threshold value, the vector determining module 2052 sets the original motion vector of the matching block as the motion vector of the block (step 325); finally, the picture interpolation module 2053 utilizes the motion vector of the block to generate the image of the block (step 330).

In a practical implementation, the vector determining module 2052 calculates a motion vector of the block as the first candidate vector of the block according to a block matching algorithm, and utilizes the reference vector with the block within the interpolated picture as the starting position to derive a matching block within the previous interpolated picture or within the next interpolated picture (i.e., the second interpolated picture), and calculates a motion vector of the matching block within the previous interpolated picture or within the next interpolated picture by the block matching algorithm as a second candidate vector. After deriving the first candidate vector and the second candidate vector, the vector determining module 2052 will choose one of the first candidate vector and the second candidate vector as the motion vector of the block, and the picture interpolation module 2053 will generate the image of the interpolated block according to the motion vector determined by the vector determining module 2052.

Figure 4:
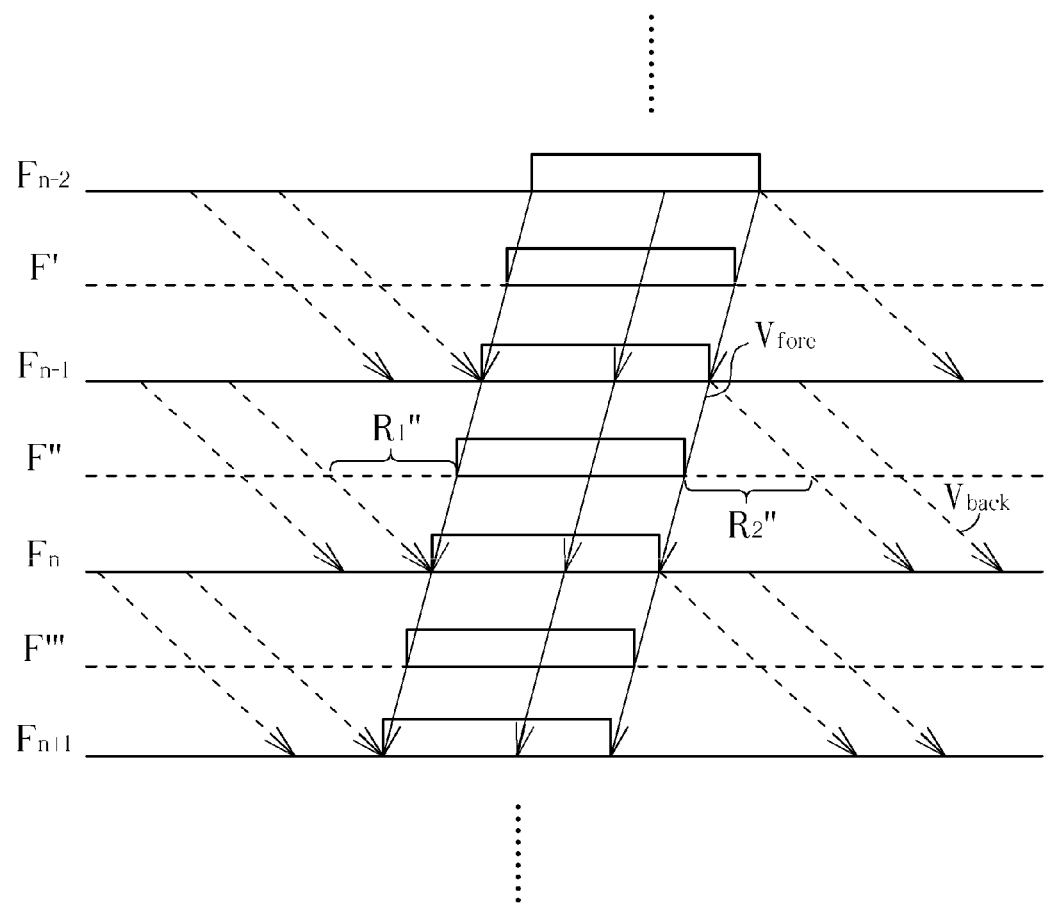
FIG. 4 is a diagram of an output image generated by a calculating unit shown in FIG. 2 which performs a frame rate conversion.

In the descriptions above, there is at least one non-interpolated picture between the first interpolated picture and the second interpolated picture, i.e., the first interpolated picture can be generated from performing an interpolation upon the picture immediately preceding the second interpolated picture. For an illustration of this, please refer to FIG. 4, which illustrates that the calculating unit 205 shown in FIG. 2 performs frame rate conversion for multiple input images (frames or fields, only $F_{n-2}, F_{n-1}, F_n, F_{n+1}$ are illustrated here) to generate multiple output images. For example, frames $F_{n-2}, F_{n-1}, F_n, F_{n+1}$ are input frames at 60 Hz, and the calculating unit 205 performs frame rate conversion for those input frames to thereby generate frames $F_{n-2}$, F', $F_{n-1}$, F", $F_n$, F''', $F_{n+1}$ at 120 Hz, where 60 Hz and 120 Hz are for illustrative purposes only, and are not limitations to this invention. In addition, the image processing apparatus 200 in this embodiment can also be applied for processing frame rate conversion at different conversion rates after proper modifications. For instance, the modified image processing apparatus 200 can be implemented for converting images at 60 Hz into images at 240 Hz. In other words, the image processing apparatus 200 is capable of interpolating one or more pictures between two pictures to achieve frame rate conversion at different conversion rates.

In a practical implementation, the calculating unit 205 at least generates an interpolated picture F' between pictures $F_{n-2}, F_{n-1}$, generates another interpolated picture F" between pictures $F_{n-1}, F_n$, and generates yet another interpolated picture F''' between pictures $F_n, F_{n+1}$. In the embodiment of the present invention, the first interpolated picture is F"; for an area $R_1$" within the first interpolated picture F", the second interpolated picture is F' (i.e., the previous interpolated picture immediately preceding the first interpolated picture F"), and for an area $R_2$" within the first interpolated picture F", the second interpolated picture is F''' (i.e., the next interpolated picture immediately following the first interpolated picture F"). In other words, in the present invention, when the interpolated area is related to the covered area (for example, area $R_1$"), the second interpolated picture is prior to the first interpolated picture in time; when the interpolated area is related to the uncovered area (for example, area $R_2$"), the second interpolated picture is later than the first interpolated picture in time. Taking image pictures $F_{n-1}, F_{n-2}, F_n, F_{n+1}$ in FIG. 4 as an example, a moving direction of a foreground object is from right to left (which is indicated by a motion vector $V_{fore}$), while a moving direction of a background image is from left to right (which is indicated by a motion vector $V_{back}$). It should be noted that this example of horizontal movement is for ease of explanation, and the embodiment of this invention can also be employed to deal with a moving direction of an image in any direction, such as a vertical direction, a diagonal direction, etc.

The following description addresses the operation of the vector generating module 2051 generating two candidate vectors $MV_L$ and $MV_R$ for each interpolated block of each interpolated picture (including F', F", F''', etc). First of all, the vector generating module 2051 calculates motion vectors of all interpolated blocks according to the block matching algorithm, and then utilizes every calculated motion vector and a plurality of motion vectors of a plurality of neighboring blocks to calculate a chaos extent of the motion vectors to derive a data curve. With regard to this embodiment, the data curve is a curve generated according to a cross section of the chaos extent of motion vectors in a horizontal direction of a certain interpolated block, where the data curve is representative of difference values of a plurality of successive blocks along one dimension, and the chaos extent indicates a motion vector variance of motion vectors, i.e., the data curve comprises a plurality of values which represent a variance extent of different motion vectors along a specific direction. Please refer to FIG. 5A. FIG. 5A is an exemplary diagram of calculating values which indicate variance extents of motion vectors according to the present invention. If motion vectors of the first interpolated block and the neighboring blocks calculated by the block matching algorithm are $MV_{00}$ and $MV_{-2-2} \sim MV_{22}$, respectively, a motion vector variance value, MV_VAR, can be derived from these motion vectors by summing up one absolute value derived from the largest horizontal component minus the smallest horizontal component and another absolute value derived from the largest vertical component minus the smallest vertical component. Specifically, the calculation of the motion vector variance value MV_VAR can be shown using the following equation:

$$MV\_VAR = |MAX(MV_x) - MIN(MV_x)| + |MAX(MV_y) - MIN(MV_y)| \quad (1)$$

In the above equation (1), $MV_x$ and $MV_y$ represent a horizontal component (component along x axis) and a vertical component (component along y axis), respectively. It should be noted that a 5×5 block range is not meant to be a limitation to this invention, and the invention can also be implemented using an N×N block range or an N×M block range. In addition, the calculation of the motion vector variance value MV_VAR can also be implemented using the following equations (2) and (3):

$$MV\_VAR = |MAX(MV_x) - MIN(MV_x)| + |MAX(MV_y) - MIN(MV_y)| + SAD \quad (2)$$

$$MV\_VAR = \alpha \times \{|MAX(MV_x) - MIN(MV_x)| + |MAX(MV_y) - MIN(MV_y)|\} + \beta \times SAD \quad (3)$$

In the above equations (2) and (3), SAD represents a block matching difference value of the first interpolated block which is derived from the block matching algorithm, and parameters α and β are weighting factors. However, any equivalent variation capable of computing a value indicative of the variance extent of motion vectors still falls within the scope of this invention. From the description mentioned above, according to one of equation (1), equation (2) and equation (3), the calculating unit 205 performs calculation for different interpolated blocks one by one and then derives a first data curve CV as shown in FIG. 5B.

Figure 5B:
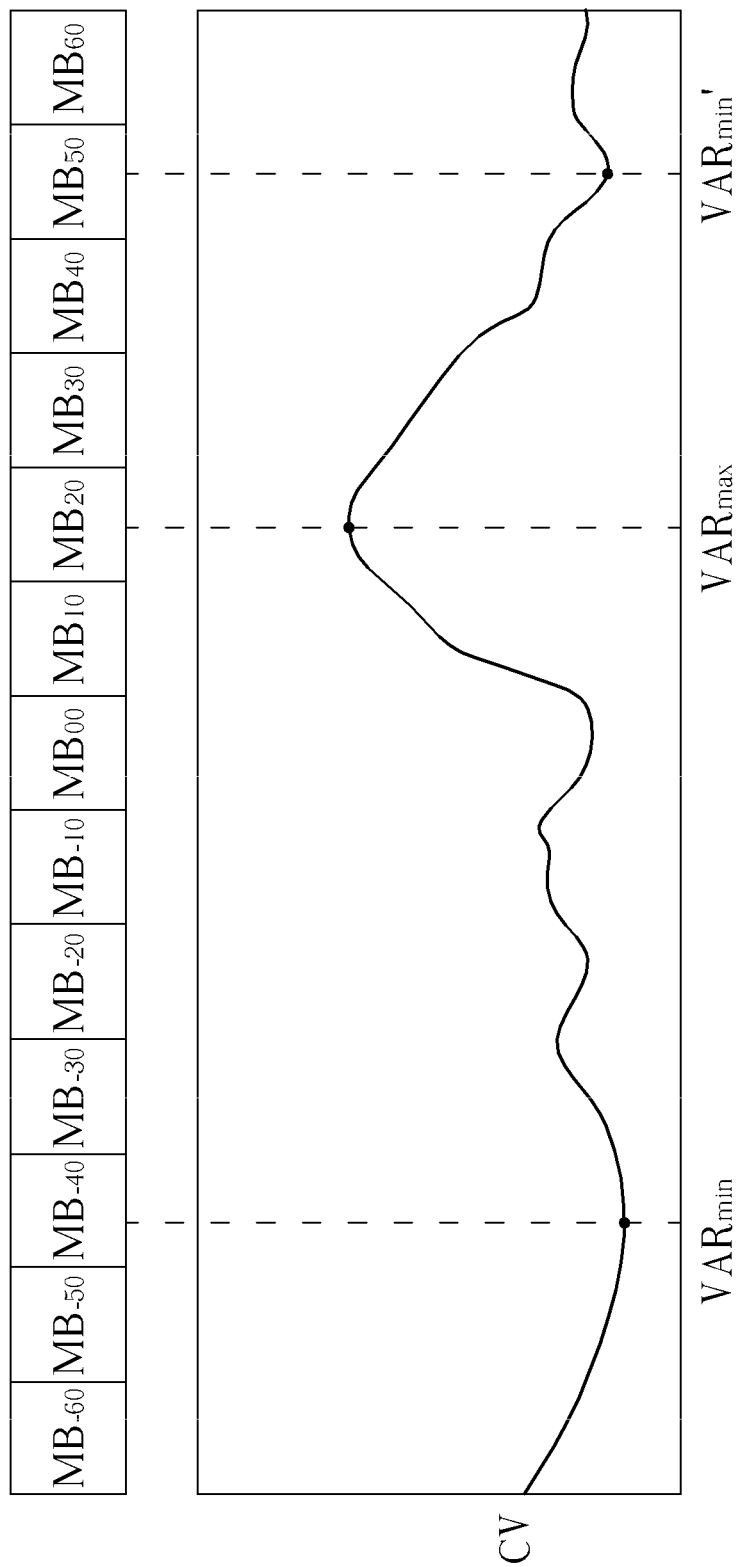
FIG. 5B is an exemplary diagram of a first data curve including multiple motion vector variation values.

FIG. 5B illustrates a first data curve CV including multiple motion vector variance values according to the present invention. $MB_{00}$ is a first interpolated block, and, based on the curve shown in FIG. 5B, the vector generating module 2051 determines two candidate vectors $MV_1$, $MV_2$ of the first interpolated block $MB_{00}$. In the moving direction (e.g., a horizontal direction) of a background image or a foreground image, the vector generating module 2051 picks a maximum value (e.g., $VAR_{max}$ in FIG. 5B) among all motion vector variance values corresponding to a plurality of blocks (e.g., six blocks $MB_{10} \sim MB_{60}$ at the left hand side of the first interpolated block and six blocks $MB_{-10} \sim MB_{-60}$ at the right hand side of the first interpolation) distributed in a horizontal axis (i.e., the moving direction of the background image or the foreground image) passing through the first interpolated block, and then the vector generating module 2051 picks two blocks corresponding to minimum motion vector variance values located at the left hand side and the right hand side of the found maximum value $VAR_{max}$, respectively. For instance, blocks $MB_{-40}$ and $MB_{50}$ are selected, and motion vectors of those two blocks $MB_{-40}$ and $MB_{50}$ derived by the block matching difference algorithm are utilized to serve as two candidate vectors $MV_1$, $MV_2$ of the first interpolated block. In other words, the candidate vector $MV_1$ of the first interpolated block corresponds to a minimum value $VAR_{min}$ at the left hand side of the maximum value $VAR_{max}$ of the first data curve CV, and the candidate vector $MV_1$ is also called the left motion vector of the first interpolated block $MB_{00}$; in addition, the candidate vector $MV_2$ of the first interpolated block corresponds to a minimum value $VAR_{min}$ at the right hand side of the maximum value $VAR_{max}$ of the first data curve CV, where the candidate vector $MV_2$ is also called the right motion vector of the first interpolated block. Furthermore, one of the candidate vectors $MV_1$ and $MV_2$ corresponds to a background motion vector, while the other corresponds to a foreground motion vector. This is because the motion vector variance value of the neighboring area of the covered or uncovered area will be very large, and the image block corresponding to the minimum motion vector variance value implies a foreground motion vector or a background motion vector, depending on the image block being located in the covered or uncovered area. Therefore, if the first interpolated block $MB_{00}$ is located in one of the covered areas and the uncovered areas, one of the candidate vectors $MV_1$ and $MV_2$ corresponds to the background motion vector while the other corresponds to the foreground motion vector. It should be noted that two candidate vectors (also called left motion vector and right motion vector) in this embodiment are in fact one foreground motion vector and one background motion vector, respectively. In a practical implementation, two candidate vectors of a block might not be exactly a background vector and a foreground vector; however, the present invention can also be applied to such a scenario. From the operation described above, the vector generating module 2051 is capable of calculating two candidate vectors $MV_1$ and $MV_2$ corresponding to each interpolated block of the interpolated picture F'.

Figure 6A:
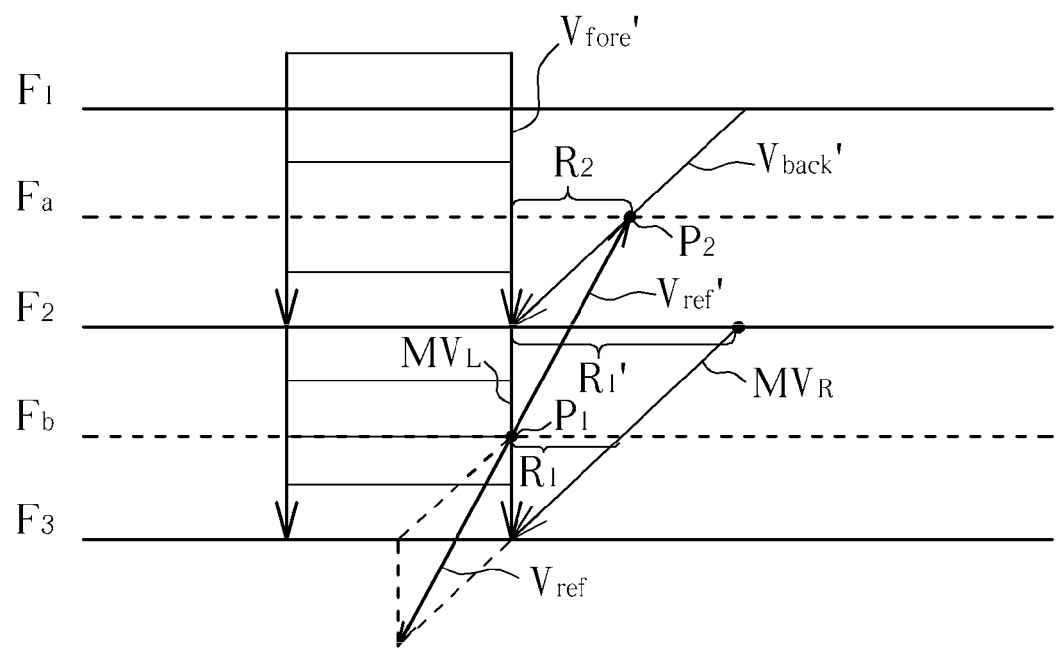
FIG. 6A is an exemplary diagram of an operation of the vector determining module shown in FIG. 2 generating the reference vector according to another embodiment.

After the vector generating module 2051 generates motion vectors $MV_L$ and $MV_R$, the vector determining module 2052 can determine whether an interpolated block within the interpolated picture belongs to the covered area (or the uncovered area) or the neighboring areas thereof (i.e., determining whether the interpolated block is related to the covered area or the uncovered area) according to the motion vectors $MV_L$ and $MV_R$. Next, the vector determining module 2052 calculates a reference vector according to the motion vectors $MV_L$ and $MV_R$ of each interpolated block and the determining result mentioned above. For ease of explanation, the following utilizes another input image (including frames $F_1$, $F_2$ and $F_3$) as an example to illustrate how the present embodiment generates the reference vector. Please refer to FIG. 6A. FIG. 6A is a diagram illustrating an operation where the vector determining module 2052 in FIG. 2 generates the reference vector according to another embodiment of the present invention. As shown in FIG. 6A, in the horizontal direction, the foreground object image is still (which is indicated by a motion vector $V_{fore}'$), and the background image moves horizontally from right to left (which is indicated by a motion vector $V_{back}'$). Since this embodiment primarily utilizes a horizontally moving image as an example for explanation, a motion vector from left to right is set as positive, and the opposite direction (from right to left) is set as negative; however, this is not supposed to be a limitation to the present invention, and alternative embodiments that utilize a specific direction as a positive direction and the opposite direction as a negative direction still fall within the scope of the present invention.

Figure 6B:
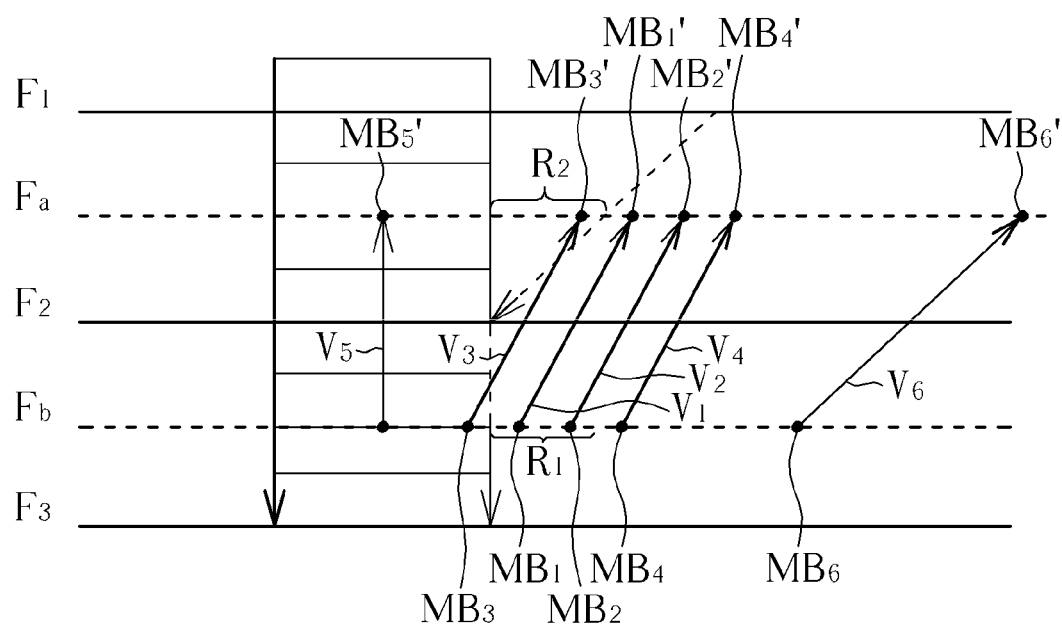
FIG. 6B is a diagram illustrating an example of an operation of generating reference vectors of different blocks by the calculating unit shown in FIG. 2 according to the embodiment shown in FIG. 6A.

In a practical implementation, the way of generating the reference vector of an interpolated block is by determining the vector magnitude of the reference vector according to the motion vectors $MV_L$, $MV_R$, and determining the vector direction of the reference vector according to the determining result described above. For the magnitude of the reference vector, a block indicated by a position $P_1$ shown in FIG. 6A is located at the edge between the foreground object image and the covered area $R_1$, and the first and the second candidate vectors $MV_L$ and $MV_R$ are a foreground motion vector and a background motion vector, respectively. As shown in FIG. 6A, the first and the second candidate vectors $MV_L$ and $MV_R$ form two sides of a triangle, and the third side falls on the picture $F_2$. According to the principle of similar triangles, the covered area includes an image range which is exactly half of the image range of the area $R_1'$ within the picture $F_2$, and the vector determining module 2052 can derive a vector $V_{ref}$ by a vector addition calculation of a half of the motion vector $MV_L$ and a half of the motion vector $MV_R$, where the magnitude of the vector $V_{ref}$ is the magnitude of the reference vector. For the direction of the reference vector, the vector determining module 2052 utilizes a vector result derived from the motion vector $MV_L$ minus the motion vector $MV_R$ to determine whether the interpolated block is related to the covered area or the uncovered area, and thereby determines to set a vector generated from the vector addition calculation reversely to derive the reference vector. In this example, the reference vector $V_{ref}'$ is derived from setting the vector $V_{ref}$ reversely. As can be seen from the figure, the reference vector $V_{ref}'$ starts from the position $P_1$ and points to a position $P_2$ within the interpolated picture $F_a$, where the position $P_2$ is at the edge between the covered area $R_2$ and the background image. The following paragraphs uses FIG. 6B and FIG. 6C to describe operations directed to different interpolated blocks within FIG. 6A.

First of all, the interpolated picture $F_b$ between pictures $F_2$ and $F_3$ is taken as an example. For interpolated blocks which actually belong to the covered area $R_1$ (for example, the interpolated block $MB_1$ close to the foreground object image), its motion vectors $MV_L$, $MV_R$ are the foreground motion vector and background motion vector, respectively. According to the aforementioned calculation, the vector determining module 2052 performs a vector addition calculation of a half of the motion vector $MV_L$ and a half of the motion vector $MV_R$ to derive a vector $V_1$, and then subtracts the motion vector $MV_R$ from the motion vector $MV_L$ to thereby derive a vector result. Since the vector result turns out to be positive (from left to right), the vector determining module 2052 acknowledges that the interpolated block $MB_1$ is related to the covered area and determines that the reference vector $V_1$ derived later from the interpolated block $MB_1$ should point at a previous interpolated picture $V_1$ according to the vector result, i.e., the vector determining module 2052 reverses the vector result $V_1$ according to the vector result to generate the reference vector $V_1$ of the interpolated block $MB_1$ shown in FIG. 6B, wherein the reference vector $V_1$ starts from the interpolated block $MB_1$ to point at a position of a block $MB_1'$ within a previous interpolated picture $F_a$. This is because the reference vector $V_{ref}'$ in FIG. 6A points at the position $P_2$, and the reference vector $V_1$ points at the block $MB_1'$, since the block $MB_1'$ actually does not belong to the covered area $R2$ within the interpolated picture $F_a$ and the motion vector derived from the block $MB_1$ by the block matching algorithm is a background motion vector; likewise, for an interpolated block $MB_2$ (the block $MB_2$ is more close to the background image but actually still belongs to the covered area $R_2$) that actually belongs to the covered area $R_1$, the vector determining module 2052 follows the aforementioned computation rule and derives a reference vector $V_2$ starting from the interpolated block $MB_2$ and pointing at a position of a block $MB_2'$ within a previous interpolated picture $F_a$. The block $MB_2'$ actually does not belong to the covered area $R_2$ within the interpolated picture $F_a$ and the motion vector derived from the block $MB_1'$ by the block matching algorithm is a background motion vector.

In addition, for an interpolated block $MB_3$ which is actually closer to the edge of the covered area $R_1$ but still a foreground image, its motion vectors $MV_L$, $MV_R$ are the foreground motion vector and background motion vector, respectively. However, it should be noted that the derived reference vector $V_3$ starts from the interpolated block $MB_3$ and points at a position of a block $MB_3'$ within the interpolated picture $F_a$, wherein the block $MB_3'$ actually belongs to the covered area $R_2$. Furthermore, for an interpolated block $MB_4$ which is actually closer to the edge of the covered area $R_1$ but still a background image, its motion vectors $MV_L$, $MV_R$ are the foreground motion vector and background motion vector, respectively. However, it should be noted that the derived reference vector $V_4$ starts from the interpolated block $MB_4$ and points at a position of a block $MB_4'$ within the interpolated picture $F_a$, wherein the block $MB_4'$ actually belongs to the background image. Moreover, for an interpolated block $MB_5$ which actually does not belong to the covered area $R_1$ and does not fall into the neighboring area, its motion vectors $MV_L$, $MV_R$ are the foreground motion vector and background motion vector, respectively, and the vector result derived from the motion vector $MV_L$ minus the motion vector $MV_R$ by the vector determining module 2052 is almost zero (indicating that it belongs to neither the covered area nor the neighboring area thereof). When the vector result is almost zero, the reference vector $V_5$ (the magnitude of the reference vector $V_5$ is derived from an addition calculation of a half of both foreground vectors, therefore it still indicates a magnitude of the foreground vector) starts from the interpolated block $MB_5$ to point at a position of a block $MB_5'$ within the previous interpolated picture $F_a$ or at a position of an interpolated block within a next interpolated picture (which is not shown in the figure), leading to no influence on subsequent calculations. Therefore, the vector determining module 2052 can still determine whether to reverse the vector addition result to generate the reference vector $V_5$ according to the vector result being positive or negative. In this embodiment, the vector determining module 2052 reverses the vector addition result to generate the reference vector $V_5$. Likewise, for an interpolated block $MB_6$ which actually does not belong to the covered area $R_1$ and does not fall into the neighboring area, its motion vectors $MV_L$, $MV_R$ are the background motion vector and foreground vector, respectively, and the vector result derived from the motion vector $MV_L$ minus the motion vector $MV_R$ by the vector determining module is almost zero. When the vector result is almost zero, the reference vector $V_6$ starts from the interpolated block $MB_6$ and points at a position of a block $MB_6'$ within the previous interpolated picture $F_a$ or at a position of an interpolated block within a next interpolated picture (which is not shown in the figure), leading to no influence on subsequent calculations. Therefore, the vector determining module 2052 can still determine whether to reverse the vector addition result to generate the reference vector $V_6$ according to the vector result being positive or negative. In this embodiment, the vector determining module 2052 reverses the vector addition result to generate the reference vector $V_6$, wherein the magnitude of the reference vector $V_6$ is derived from an addition calculation of a half of both background vectors, therefore it still indicates a magnitude of the background vector.

Figure 6C:
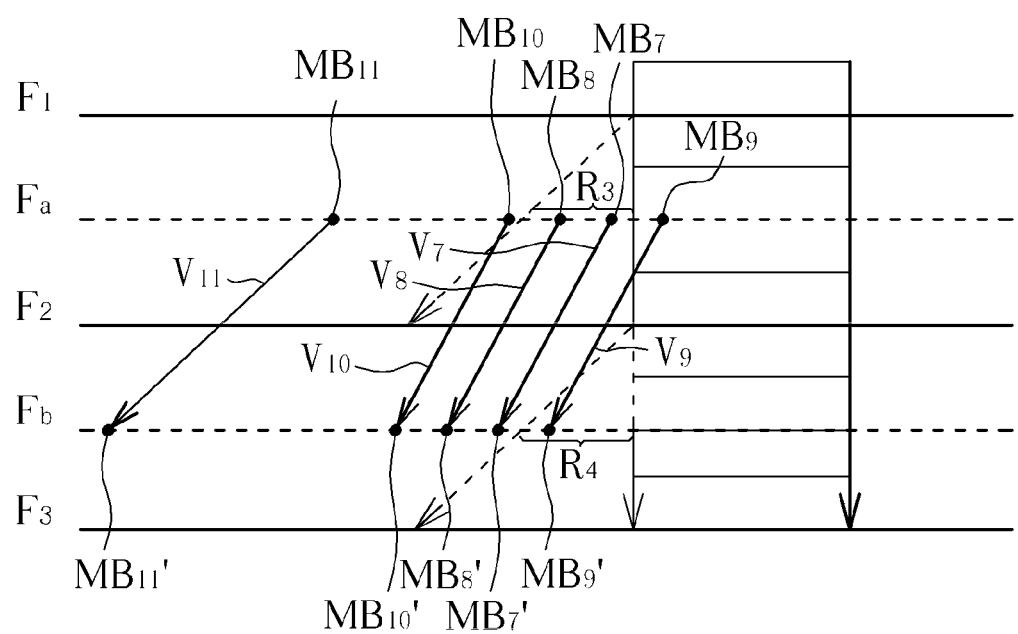
FIG. 6C is a diagram illustrating another example of an operation of generating reference vectors of different blocks by the calculating unit shown in FIG. 2 according to the embodiment shown in FIG. 6A

Please refer to FIG. 6C. The interpolated picture $F_a$ is taken as an example. For an interpolated block (for example, the interpolated block $MB_7$ which is close to the foreground object image) which actually belong to the uncovered area $R_3$, its motion vectors $MV_L$, $MV_R$ are the background motion vector and foreground motion vector, respectively. The vector determining module 2052 picks a half of the motion vector $MV_L$ and a half of the motion vector $MV_R$ to perform vector addition calculation to derive a vector $V_7$ as shown in FIG. 6C, and the vector determining module 2052 subtracts the motion vector $MV_R$ from the motion vector $MV_L$ to derive a vector result. Since the vector result is negative (which indicates a direction from right to left), the vector determining module 2052 acknowledges that the interpolated block $MB_7$ is related to the uncovered area $R_3$, and determines that the reference vector derived later from interpolated block $MB_7$ should point at a next interpolated picture $F_b$ according to the vector result, i.e., the vector determining module 2052 sets the vector $V_7$ as the reference vector rather than reverses the vector result $V_7$ according to the vector result. Therefore, the derived reference vector $V_7$ starts from the interpolated block $MB_7$ and points at a position of a block $MB_7'$ within a next interpolated picture $F_b$, wherein the block $MB_7'$ actually does not belong to the uncovered area $R_4$ and the motion vector derived from the block $MB_7'$ by the block matching algorithm is the background vector. Likewise, for an interpolated block $MB_8$ which is closer to the background image but actually still belongs to the uncovered area $R_3$, the vector determining module 2052 can still follow the aforementioned computation rule to derive a reference vector $V_8$ which starts from the interpolated block $MB_8$ and points at a position of a block $MB_8'$ within a next interpolated picture $F_b$, as shown in FIG. 6C.

In addition, for an interpolated block $MB_9$ which is actually closer to the edge of the uncovered area but still a foreground image, its motion vectors $MV_L$, $MV_R$ are the background motion vector and foreground motion vector, respectively. However, it should be noted that the derived reference vector $V_9$ starts from the interpolated block $MB_9$ and points at a position of a block $MB_9'$ within the interpolated picture $F_b$, wherein the block $MB_9'$ actually belongs to the uncovered area $R_4$. Furthermore, for an interpolated block $MB_{10}$ which is actually closer to the edge of the uncovered area but still a background image, its motion vectors $MV_L$, $MV_R$ are the background motion vector and foreground motion vector, respectively. However, it should be noted that the derived reference vector $V_{10}$ starts from the interpolated block $MB_{10}$ and points at a position of a block $MB_{10}'$ within the interpolated picture $F_b$, wherein the block $MB_{10}'$ actually belongs to the background image. Moreover, for an interpolated block $MB_{11}$ which actually does not belong to the uncovered area $R_3$ and does not fall into the neighboring area, its motion vectors $MV_L$, $MV_R$ are the background motion vector and foreground motion vector, respectively, and the vector result derived from the motion vector $MV_L$ minus the motion vector $MV_R$ by the vector determining module 2052 is almost zero (indicating that it belongs to neither the uncovered area $R_3$ nor the neighboring area thereof). When the vector result is almost zero, the reference vector $V_{11}$ starts from the interpolated block $MB_{11}$ and points at a position of a block $MB_{11}'$ within the next interpolated picture $F_b$ or at a position of an interpolated block within a previous interpolated picture (which is not shown in the figure), leading to no influence on subsequent calculations. Therefore, the vector determining module 2052 can still determine whether to reverse the vector addition result to generate a reference vector according to the vector result being positive or negative. In this embodiment, the vector determining module 2052 reverses the vector addition result to generate the reference vector $V_{11}$, wherein the magnitude of the reference vector $V_{11}$ is derived from an addition calculation of a half of both background vectors, therefore it still indicates a magnitude of the background vector.

Figure 7A:
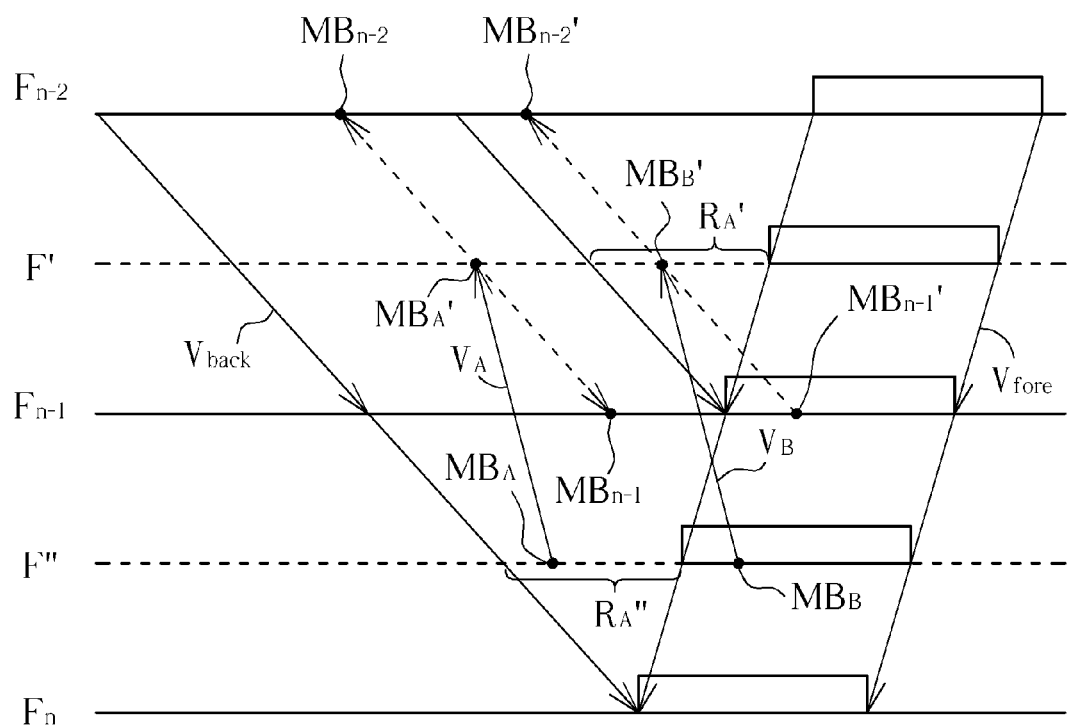
FIG. 7A is a diagram illustrating an exemplary embodiment where the vector determining module in FIG. 2 determines the second candidate vector of an interpolated block within the input image shown in FIG. 4.

Please refer to FIG. 7A. FIG. 7A is a diagram illustrating an embodiment where the vector determining module 2052 determines a second candidate vector MV' of an interpolated block within the input image shown in FIG. 4. It should be noted that the first candidate vector MV of each interpolated block in the present invention is a motion vector derived by the vector determining module 2052 according to the block matching algorithm. As shown in FIG. 7A, the foreground object image moves horizontally from right to left (which is indicated by the motion vector $V_{fore}$), and the background image moves horizontally from left to right (which is indicated by the motion vector $V_{back}$). The area $R_a'$ within the interpolated picture F' is actually a covered area, and the area $R_a''$ within the interpolated picture F'' is also actually a covered area. Taking the interpolated block $MB_A$ within the area $R_A''$ as an example, the vector determining module 2052 follows the aforementioned computation rule to generate a reference vector $V_A$ and the reference vector $V_A$ starting from the interpolated block $MB_A$ and pointing at a position of a block $MB_A'$ within the interpolated picture F', where the motion vector derived from the block $MB_A'$ according to the block matching algorithm is the second candidate vector MV' of the interpolated block $MB_A$, and the first candidate vector MV is a motion vector derived from the interpolated block $MB_A$ according to the block matching algorithm. As shown in FIG. 7A, the block $MB_A'$ which the reference vector $V_A$ points at actually does not belong to the covered area $R_A'$. The block matching algorithm is able to find the same or similar image within image pictures $F_{n-2}$ and $F_{n-1}$ (image blocks $MB_{n-2}$ and $MB_{n-1}$); therefore, since the block matching difference value (i.e., the difference value between the image block $MB_{n-2}$ and $MB_{n-1}$) derived from the second candidate value MV' is very small, the vector determining module 2052 determines that the second candidate vector MV' corresponds to the background motion vector. In a practical implementation, the vector determining module 2052 compares the calculated block matching difference value with a specific threshold value TH to determine whether the second candidate vector MV' corresponds to an operation associated with the background motion vector.

In addition, taking the interpolated block $MB_B$, which is actually close to the covered area $R_A''$ but belongs to the foreground image, as an example, the derived reference vector $V_B$, as shown in FIG. 7A, starts from the interpolated block $MB_B$ and points at a position of the block $MB_B'$ which belongs to the covered area $R_A'$ within the interpolated picture F'; meanwhile, the motion vector of the block $MB_B'$ derived according to the block matching algorithm is the second candidate vector MV' of the interpolated block $MB_B$, and the first candidate vector MV is the motion vector derived from the interpolated block $MB_B$ according to the block matching algorithm. In this embodiment, the block $MB_B'$ pointed to by the reference vector $V_B$ actually belongs to the covered area $R_A'$. Since the image of the block $MB_{n-2}'$ within the picture $F_{n-2}$ is covered by the foreground object in picture $F_{n-1}$, the block matching algorithm is not able to find a same or similar image within pictures $F_{n-1}$ and $F_{n-2}$, even with the help of background motion vector (the image of the block $MB_{n-2}'$ is a background image and differs greatly from the foreground image of the block $MB_{n-2}'$), therefore, the calculated block difference value according to the second candidate vector MV' will be huge. In this way, the vector determining module 2052 can determine that the second candidate vector MV' of the interpolated block $MB_B$ is not a background motion vector. In a practical implementation, the vector determining module 2052 compares the calculated block matching difference value with the specific threshold value TH to acknowledge that the block matching difference value is not less than the specific threshold value TH, and thereby determines that the second candidate vector MV' is not a background vector.

In the embodiment of FIG. 7A, taking the interpolated block $MB_A$ as an example, the block matching difference value of the block $MB_A'$ within the interpolated picture F' derived according to the second candidate vector MV' is less than the specific threshold value TH, and therefore the vector determining module 2052 directly utilizes the second candidate vector MV' as a target motion vector of the interpolated block $MB_A$, and the picture interpolation module 2053 generates an image of the interpolated block $MB_A$ according to the aforementioned determining result and the target motion vector; however, regarding the interpolated block $MB_B$, the block matching difference value of the block $MB_B'$ within the interpolated picture F' derived according to the second candidate vector MV' is not less than the specific threshold value TH, and therefore the vector determining module 2052 directly utilizes the first candidate vector MV as the target motion vector of the interpolated block $MB_B$, and the picture interpolation module 2053 generates an image of the interpolated block $MB_B$ according to the target motion vector. As described above, only when the block matching difference value derived according to the second candidate vector MV' is less than the specific threshold value TH, will the vector determining module 2052 determine the second candidate vector MV' as the background motion vector, and utilize the second candidate vector MV' as the target motion vector of the interpolated block, and the picture interpolation module 2053 thereby adopts the target motion vector to copy a specific image from the previous input image picture or the next input image picture as the image of the interpolated picture. For example, the vector determining module 2052 is able to determine whether the interpolated block MBA (MBB) is related to the covered area or the uncovered are according to the difference between the motion vectors $MV_L$, $MV_R$ of the interpolated block $MB_A$ (or $MB_B$). Regarding the interpolated blocks $MB_A$ and $MB_B$, the vector determining module 2052 determines that both interpolated blocks are related to the covered area; nevertheless, the block matching difference value of the block $MB_A'$ derived according to the second candidate vector MV' is less than the specific threshold value TH whereas the block matching difference value of the block $MB_B'$ derived according to the second candidate vector MV' is not less than the specific threshold value TH, and therefore the picture interpolation module 2053 utilizes the second candidate vector MV' (which is a background motion vector) of the interpolated block $MB_A$ to copy a corresponding image from the previous input image picture $F_{n-1}$ as the image of the interpolated block $MB_A$, and utilizes the first candidate vector MV (which is a foreground motion vector) of the interpolated block $MB_B$ to copy a corresponding image from the previous input image picture $F_{n-1}$ as the image of the interpolated block $MB_B$. That is, the image of the foreground object is properly displayed in the interpolated block $MB_B$ and the background image is properly displayed in the interpolated block $MB_A$, leading to an enhancement of the image quality.

Figure 8:
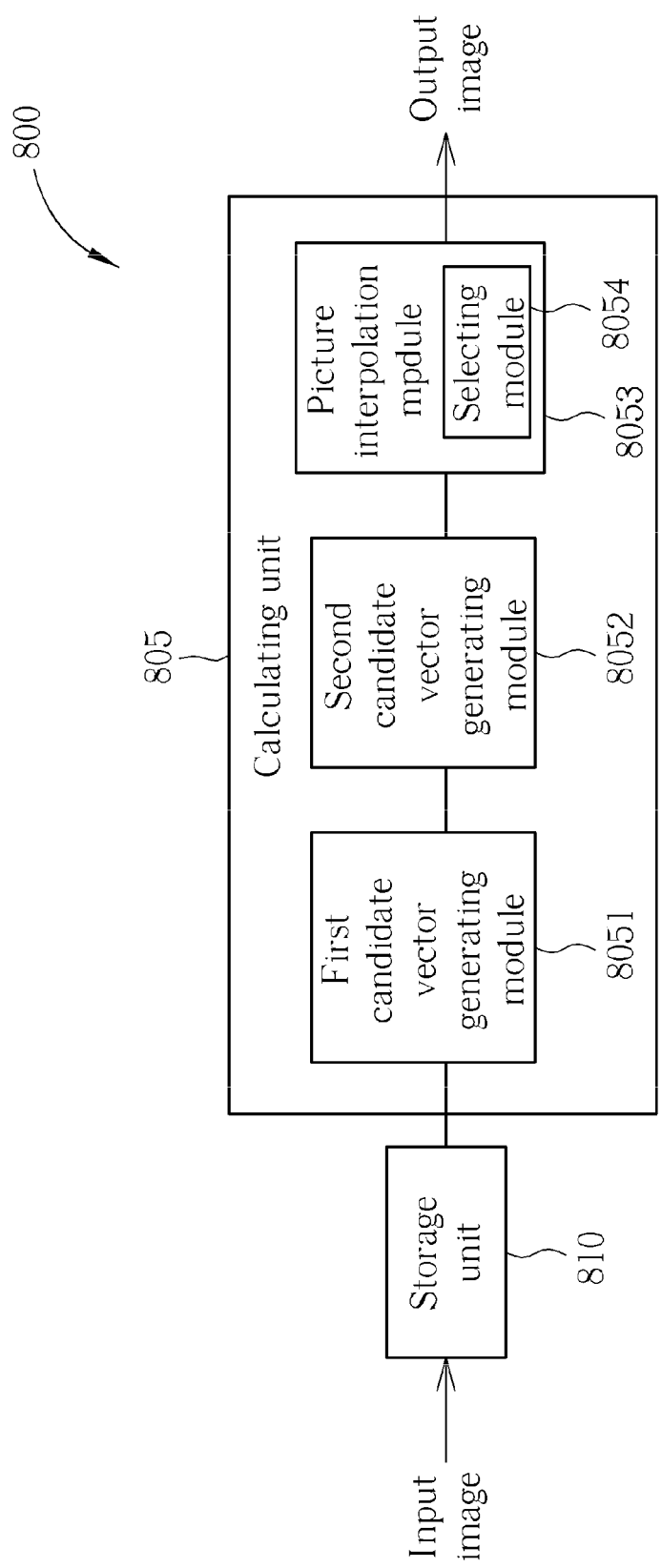
FIG. 8 is a block diagram of a second embodiment of an image processing apparatus according to the present invention.

Additionally, in the second embodiment, the image of the interpolated block can also be generated from combining images of different image blocks according to the first and the second candidate vectors MV, MV', and no additional target motion vector is required. Please refer to FIG. 8, which is a diagram illustrating an image processing apparatus 800 according to the second embodiment of the present invention. The image processing apparatus 800 is for determining a motion vector of a covered/uncovered area within an interpolated picture when performing a picture interpolation. The image processing apparatus 800 comprises a calculating unit 805 and a storage unit 810, wherein as the function and operation of the storage unit 810 are similar to that of the storage unit 210 in FIG. 2, further description is omitted here for brevity. The calculation unit 805 comprises a first candidate vector generating module 8051, a second candidate vector generating module 8052 and a picture interpolation module 8053. The first candidate vector generating module 8051 determines a first motion vector $MV_L$ and a second motion vector $MV_R$ of a block within the interpolated picture according to a motion vector of the block within the interpolated picture and motion vectors of a plurality of neighboring blocks, wherein the motion vector of the block is a first candidate vector MV. The second candidate vector generating module 8052 calculates a reference vector of the block according to the first motion vector $MV_L$ and the second motion vector $MV_R$, utilizes the reference vector with the block within the interpolated picture as a starting position to therefore derive a matching block within the previous interpolated picture or within the next interpolated picture, and sets a motion vector of the matching block within the previous interpolated picture or within the next interpolated picture as a second candidate vector MV'. The picture interpolation module 8053 performs a picture interpolation of the block according to the first and the second candidate vectors MV, MV'.

The picture interpolation module 8053 further comprises a selecting module 8054 which selects one of the first candidate vector MV and the second candidate vector MV' as an updated motion vector used in the picture interpolation of the block. The picture interpolation module 8053 sets the motion vector of the block by the second candidate vector MV' when a block matching difference value which is derived from the matching block within the previous interpolated picture or the next interpolated picture according to the second candidate vector MV' is less than a specific threshold value; the picture interpolation module 8053 sets the motion vector of the block by the first candidate vector MV when a block matching difference value which is derived from the matching block within the previous interpolated picture or the next interpolated picture according to the second candidate vector MV' is not less than the specific threshold value. In addition, the picture interpolation module 8053 further determines a weighting value according to a block matching difference value derived from the matching block within the previous interpolated picture or the next interpolated picture, and performs the picture interpolation of the block according to the first candidate vector MV, the second candidate vector MV' and the weighting value. The picture interpolation module 8053 utilizes a non-interpolated picture immediately preceding the interpolated picture to perform the picture interpolation when the interpolated block is located within the covered area, and utilizes a non-interpolated picture immediately following the interpolated picture to perform the picture interpolation when the interpolated block is located within the uncovered area. A detailed operation is described as follows.

For example, with regard to the interpolated block $MB_A$, the picture interpolation module 8053 refers to a corresponding image within a previous non-interpolated picture $F_{n-1}$ immediately preceding the interpolated picture F" to generate a first image $F_{1st}$ according to the first candidate vector MV, and refers to another corresponding image within the picture $F_{n-1}$ to generate a second image $F_{2nd}$ according to the second candidate vector MV'. Specifically, the picture interpolation module 8053 utilizes the first and the second candidate vectors MV, MV' to copy corresponding images within the picture $F_{n-1}$ to serve as the first and the second images $F_{1st}$, $F_{2nd}$, respectively; meanwhile, since the second candidate vector MV' of the interpolated block $MB_A$ is known to be a background motion vector, the picture interpolation module 8053 primarily uses the second image $F_{2nd}$ to generate the image of the interpolated block $MB_A$, which is realized using the aforementioned weighting value in a practical implementation. For example, regarding the interpolated block $MB_A$, the magnitude of the weighting value $W_A$ depends on the block matching difference value of the block $MB_A'$ within the interpolated picture F' derived from the second candidate vector MV'; furthermore, the relation between the weighting value and the block matching difference value can also be designed as a linear relation. When the block matching difference value becomes larger, the weighting value is designed to be larger, and when the block matching difference value becomes smaller, the weighting value is designed to be smaller. The picture interpolation module 8053 performs a pixel weighted averaging upon the first image $F_{1st}$ and the second image $F_{2nd}$ according to the weighting value $W_A$, and the averaged result includes almost pixel values of the second image $F_{2nd}$ due to the fact that the block matching difference value is very small, and the weighting value $W_A$ is relatively small; besides; additionally, the averaged result is used as the image of the interpolated block $MB_A$. The image of the interpolated block can be manifested by equation (4) as follows:

$$MB_A = W_A \times F_{1st} + (1 - W_A) \times F_{2nd} \qquad (4)$$

In another embodiment, for the interpolated block $MB_B$, the picture interpolation module 8053 also copies the corresponding images within the picture $F_{n-1}$ to generate the first image $F_{1st}$ and the second image $F_{2nd}$ according to the first candidate vector MV and the second candidate vector MV', respectively; meanwhile, since it is known that the second candidate vector MV' of the interpolated block $MB_B$ is not a background motion vector, the picture interpolation module 8053 primarily uses the first image $F_{1st}$ to generate the image of the interpolated block $MB_B$. As the block matching difference value of the block $MB_B$' within the picture F' derived by referring to the second candidate vector MV' is huge, the corresponding weighting value WB will become larger. The picture interpolation module 8053 thereby performs a pixel weighted averaging upon the first image $F_{1st}$ and the second image $F_{2nd}$ according to the weighting value $W_B$, where the averaged result includes almost all pixel values of the first image $F_{1st}$ due to the fact that the block matching difference value is very large, and the weighting value $W_B$ is relatively large. Additionally, the averaged result is used as the image of the interpolated block $MB_B$. The image of the interpolated block can be manifested by equation (5) as follows:

$$MB_B = W_B \times F_{1st} + (1 - W_B) \times F_{2nd} \quad (5)$$

In yet another embodiment, the method of combining images of different image blocks to generate the image of the interpolated block can also work in conjunction with the method of utilizing the target motion vector to generate the image of the interpolated block. For example, two threshold values $TH_1$, $TH_2$ can be used to achieve the aforementioned objective, wherein the threshold value $TH_2$ is larger than the threshold value $TH_1$. Assuming a second candidate vector MV' of an interpolated block points at a block within the interpolated picture F', when the block matching difference value of the block within the interpolated picture F' derived according to the block matching algorithm is less than the threshold value $TH_1$, the picture interpolation module 8053 sets the second candidate vector MV' as the target motion vector of the interpolated block, wherein since the second image picture $F_{2nd}$ is almost equivalent to the corresponding image (which is copied with the help of the target motion vector, within the image picture $F_{n-1}$), the weighting value thereof could be viewed as zero by design. When the block matching difference value of the block is equal to or larger than the threshold value $TH_2$, the picture interpolation module 8053 sets the first candidate vector MV as the target motion vector of the interpolated block, wherein since the first image picture $F_{1st}$ is almost equivalent to the corresponding image (which is copied with the help of the target motion vector within the image picture $F_{n-1}$), the weighting value thereof could be viewed as 1 by design. When the block matching difference value of the block is between the threshold values $TH_1$ and $TH_2$, the picture interpolation module 8053 generates the image of the interpolated block by combining the first and the second image pictures $F_{1st}$ and $F_{2nd}$. Further description directed to the computation process is omitted here for brevity. Any modification or variation based upon any disclosed embodiment of generating images of the interpolated blocks still falls within the scope of the present invention.

Figure 7B:
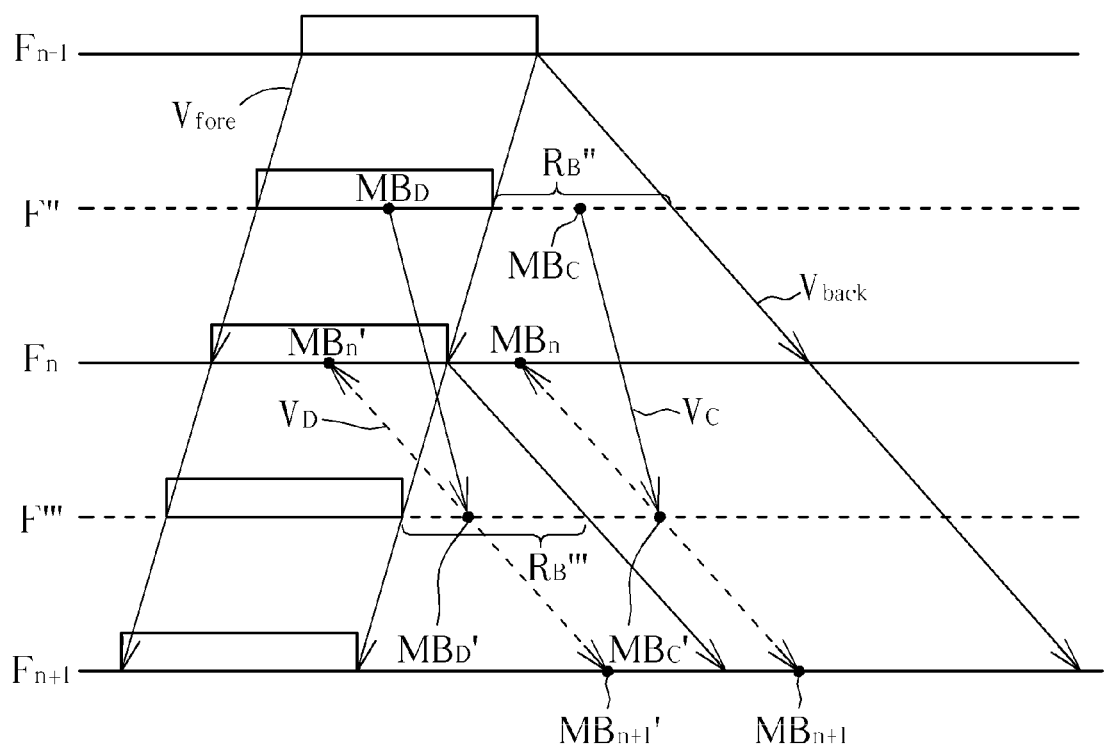
FIG. 7B is a diagram illustrating another exemplary embodiment where the vector determining module in FIG. 2 determines the second candidate vector of an interpolated block within the input image shown in FIG. 4.

Please refer to FIG. 2 in conjunction with FIG. 7B. FIG. 7B is a diagram illustrating that the vector determining module 2052 in FIG. 2 determines the second candidate vector MV' of an interpolated block within the input image shown in FIG. 4 according to another embodiment of present invention. In the present invention, the first candidate vector MV of the interpolated block is a motion vector derived by the vector determining module 2052 according to the block matching algorithm. As shown in FIG. 7B, the foreground object image moves from right to left (which is indicated by a motion vector $V_{fore}$), and the background image moves from left to right (which is indicated by a motion vector $V_{back}$); in addition, the area $R_B$" within the interpolated picture F'" is actually an uncovered area, and the area $R_B$'" within the interpolated picture F'" is also actually an uncovered area. Taking the interpolated block $MB_C$ within the area $R_B$" as an example, the vector determining module 2052 follows the aforementioned method to generate the reference vector $V_C$ that starts from the position of the interpolated block $MB_B$ and points at the position of the block $MB_C$' within the interpolated picture F'". The motion vector of the block $MB_C$' derived according to the block matching algorithm is the second candidate vector MV' of the interpolated block $MB_C$, and the first candidate vector MV is the motion vector derived from the interpolated block $MB_C$ itself according to the block matching algorithm, wherein, since the interpolated block $MB_C$ is located within the uncovered area $R_B$", the block $MB_C$' at which the reference vector $V_C$ points actually belongs to the background image and is not within the uncovered area $R_B$'". Calculating the motion vector of the block $MB_C$' using the block matching algorithm directly can find the same or similar images (image blocks $MB_n$ and $MB_{n+1}$) within the image pictures $F_n$ and $F_{n+1}$, therefore, the vector determining module 2052 can determine that the second candidate vector MV' (i.e., the motion vector of the block $MB_C$' derived using the block matching method directly) is a background motion vector according to the block matching difference value (i.e., the difference between the image blocks $MB_n$ and $MB_{n+1}$) derived from the second candidate vector MV'. In a practical implementation, the vector determining module 2052 compares the derived block matching difference value with a specific threshold value TH to determine whether the second candidate vector MV' is a background motion vector.

Taking the interpolated block $MB_D$ located in the foreground image area in FIG. 7B as an example, the derived reference vector $V_D$, as shown in FIG. 7B, starts from the position of the interpolated block $MB_D$ and points at the position of the block $MB_D$' within the interpolated picture F'", where the motion vector of the block $MB_D$' derived according to the block matching algorithm is the second candidate vector MV' of the interpolated block $MB_D$, and the first candidate vector MV is the motion vector derived from the interpolated block $MB_D$ itself according to the block matching algorithm. In this embodiment, the interpolated block $MB_D$ is not located within the uncovered area $R_B$", but the block $MB_C$' at which the reference vector $V_D$ points actually belongs to the uncovered area $R_B$'". As the block matching algorithm cannot directly find the same or similar images (image blocks $MB_n$ and $MB_{n+1}$) within the image pictures $F_n$ and $F_{n+1}$, even with the help of a background vector (the image of the block $MB_n$' is a foreground image and differs greatly from the background image of the block $MB_{n+1}$'), the vector determining module 2052 can determine that the second candidate vector MV' is not a background vector. In a practical implementation, the vector determining module 2052 compares the derived block matching difference value with a specific threshold value TH' to acknowledge that the block matching difference value is not less than the specific threshold value TH', and thereby determines that the second candidate vector MV' is not a background motion vector.

Then, the picture interpolation module 2053 can generate a target motion vector of an interpolation block (for example, the block $MB_C$ or the block $MB_D$) to derive an image of the interpolated block, or generate the image of the interpolated block by combining different images. As the operation is similar to the one of generating the image of the interpolated block in FIG. 7A, further description is omitted here for brevity.

To summarize, if an interpolated block actually belongs to a covered area or an uncovered area, the image processing apparatus 200, 800 can refer to a second candidate vector of the interpolated block to generate a correct image to thereby enhance the image quality, wherein the second candidate vector corresponds to a background motion vector; if an interpolated block actually does not belong to a covered area or an uncovered area, the image processing apparatus 200, 800 can refer to a first candidate vector of the interpolated block to generate a correct image without degrading the image quality, wherein the first candidate vector is a motion vector derived from the interpolated block according to the block matching algorithm.

Those skilled in the art will readily observe that numerous modifications and alterations of the device and method may be made while retaining the teachings of the invention.

What is claimed is:

1. An image processing method for determining a motion vector of a covered/uncovered area of an interpolated picture when a picture interpolation is performed, the interpolated picture including a plurality of blocks, the image processing method comprising:

generating a first motion vector and a second motion vector of a block within the interpolated picture;

according to the first and second motion vectors, determining which one of the covered and uncovered areas the block is located in and calculating a reference vector; and determining a motion vector of the block according to the reference vector;

wherein the reference vector is obtained from a vector calculation of the first and second motion vectors using a principle of similar triangles, and the step of generating the first motion vector and the second motion vector of the block within the interpolated picture comprises:

calculating a data curve according to an original motion vector of the block and a plurality of original motion vectors of a plurality of neighboring blocks; and determining the first motion vector and the second motion vector of the block according to the data curve, wherein the first motion vector corresponds to a minimum value to the left of a maximum value of the data curve, and the second motion vector corresponds to a minimum value to the right of the maximum value of the data curve.

2. The image processing method of claim 1, wherein the step of determining which one of the covered and uncovered areas the block is located in comprises utilizing a vector result derived from subtracting the second motion vector from the first motion vector to determine whether the block is related to the covered area or the uncovered area.

* * * * *